Dec. 20, 1966 J. E. THORNTON 3,293,418

HIGH SPEED DIVIDER

Filed July 8, 1964 2 Sheets-Sheet 1

INVENTOR
JAMES E. THORNTON

BY
Cushman, Darby & Cushman
ATTORNEYS

HIGH SPEED DIVIDER

Filed July 8, 1964 2 Sheets-Sheet 2

INVENTOR
JAMES E. THORNTON

BY
Cushman, Darby & Cushman
ATTORNEYS

United States Patent Office 3,293,418
Patented Dec. 20, 1966

3,293,418

HIGH SPEED DIVIDER

James E. Thornton, Chippewa Falls, Wis., assignor to Control Data Corporation, Minneapolis, Minn., a corporation of Minnesota Filed July 8, 1964, Ser. No. 381,042
6 Claims. (Cl. 235—156)

This invention relates to a high speed division device and, more particularly, to an improved dividing arrangement by which a high speed calculation is performed in a digital computer.

According to the normal manner of performing a division operation in a digital computer, the dividend and the divisor are expressed in a code employing two bits, a one and a zero. This system of representation is called a binary code. The division operation involves the successive examination of single bits of the dividend in order to establish partial quotients, the accumulation of which indicates the solution to the calculation. In this one bit divide operation, the steps of the process include the shifting of partial dividends and partial quotients, trial subtractions of the divisor from the partial dividends, and the sampling of sign changes resulting from these trial subtractions for the purpose of generating partial quotients one bit at a time.

The primary object of the present invention is to provide an improved arrangement for dividing numerical values within a digital computer wherein a plurality of quotient bits are simultaneously generated.

Ancillary to the immediately preceding object, it is a further object of the invention to provide a division system for a digital computer in which the time required to perform the division is appreciably diminished in comparison with prevously known systems.

It is a further object of the invention to decrease the number of shifting and subtraction steps required to generate a final quotient.

These and other objects of the invention will become more fully apparent when considered in light of the following detailed description of an illustrative embodiment of this invention and from the appended claims.

Figure 1:
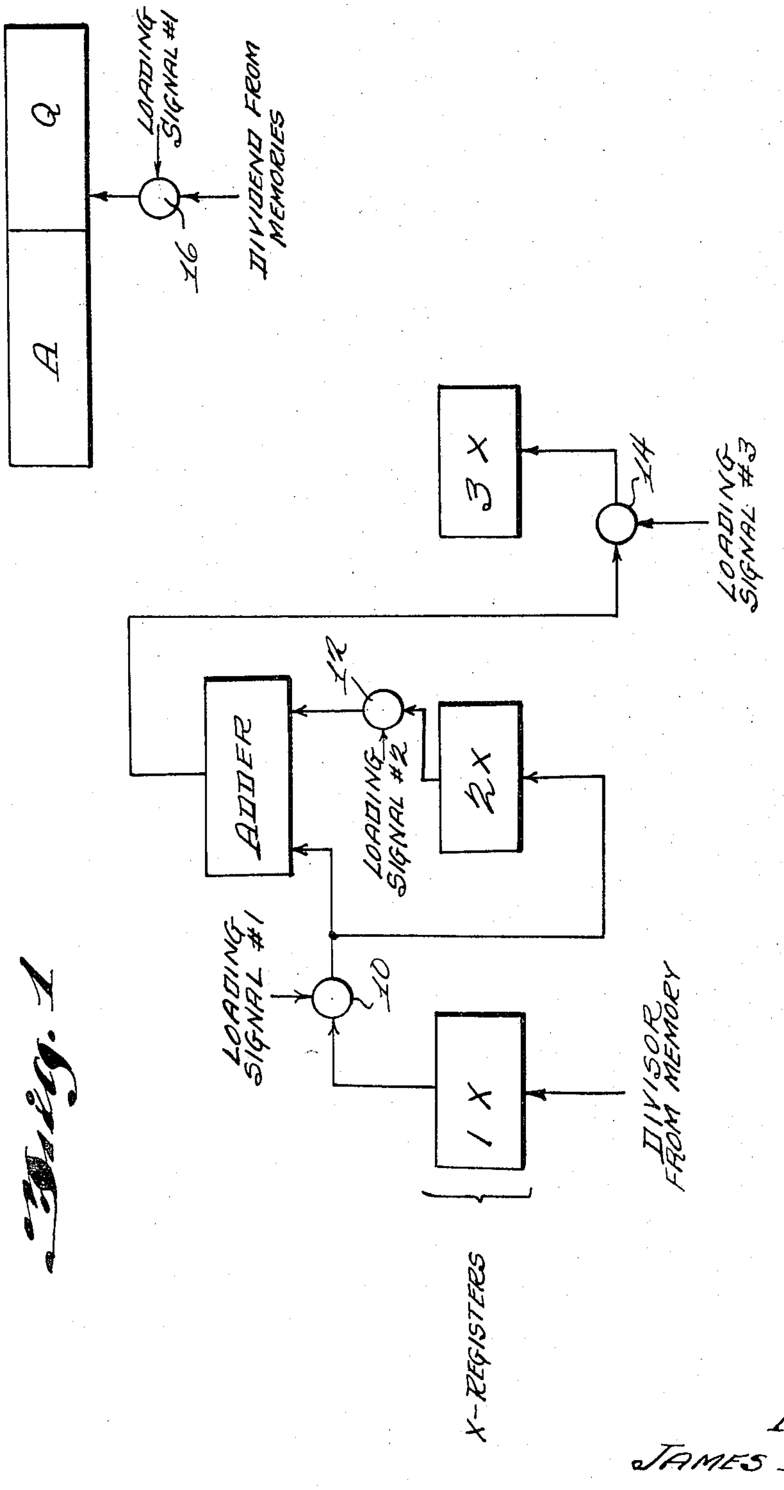
Figure 2:
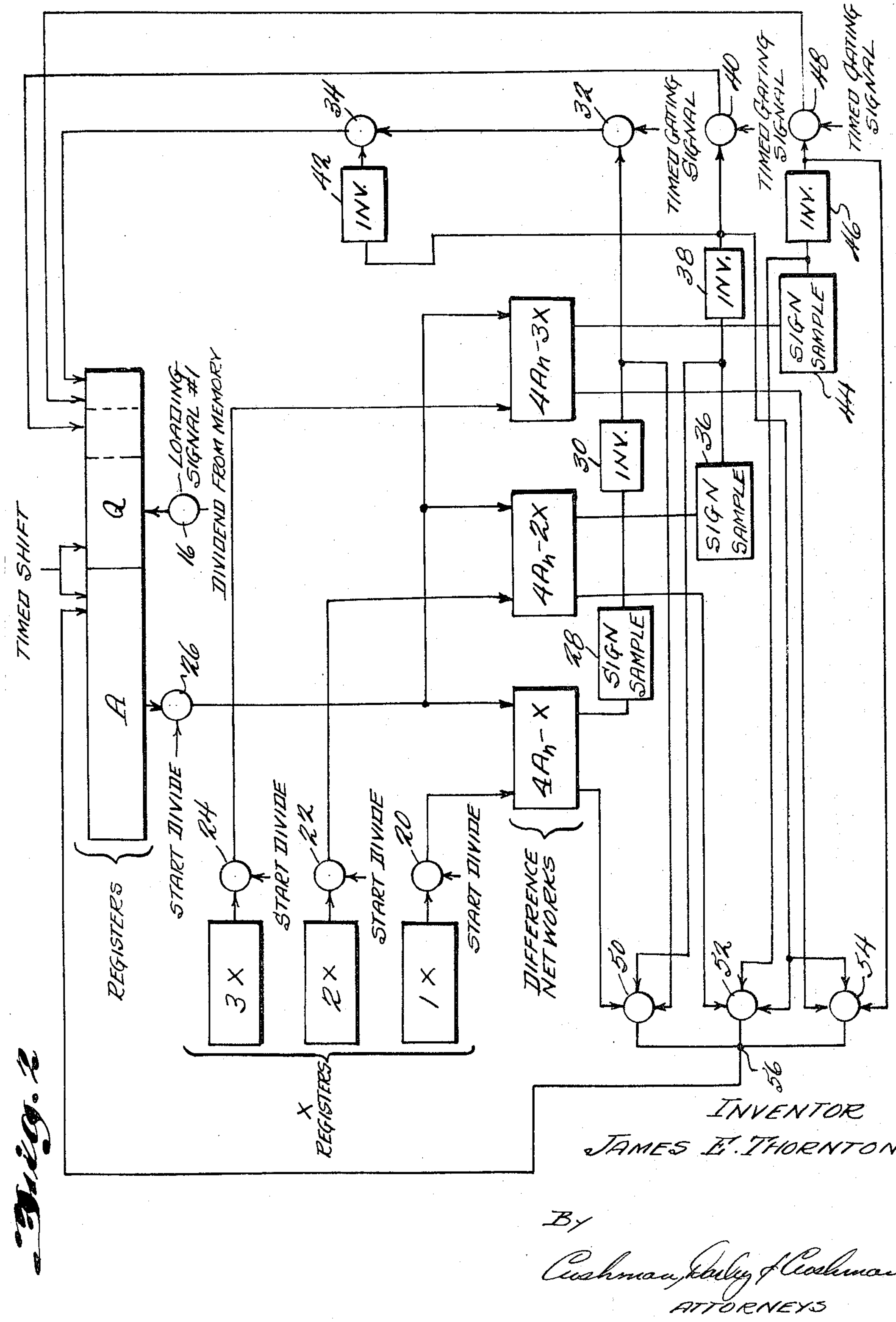

The illustrative embodiment may be best understood by reference to the accompanying drawings wherein:

FIGURE 1 is a block diagram illustrating portions of the arrangement utilized in preparing the system for a division operation; and FIGURE 2 is a block diagram illustrating one complete embodiment of the invention.

Briefly, the invention comprises an arrangement wherein multiples of the divisor are first established. These divisor multiples are simultaneously applied to separate difference networks to which a plurality of the dividend bits are also applied. Trial subtractions are performed simultaneously in each of the difference networks, and the signs resulting from the subtractions are sampled. Based on the results of these sign samplings, appropriate logic is employed to generate a plurality of partial quotient bits and to establish partial dividends. A shift operation is then performed on the partial quotient and dividend and the process is repeated. The entire operation is iterated until the entire quotient is developed.

Before entering into a discussion of a precise arrangement of the illustrative embodiment, a sample calculation will be described utilizing conventional technique and a second calculation will be set forth utilizing the system employed in the invention.

A normal one bit divide operation will first be described. This operation utilizes a left place shift of the partial dividend and partial quotient followed by a trial subtraction. If during the subtraction no sign change occurs, the trial subtraction is completed, a quotient bit of one is generated, and a new partial dividend is established. If a sign change does occur, a quotient bit of zero is generated and the partial dividend remains the same. The operation is repeated until the entire quotient is developed.

As an example of the above described operation, the following problem will be solved:

$3_{10}\ \overline{)39_{10}}=11_2\ \overline{)100111_2}$

In order to appreciate the mechanics involved in the normal one bit operation, the problem will be set up in a slightly different format as follows:

```
11 | 000000 ¦ 100111
```

The solution to this problem according to conventional one bit technique employs the following steps:

(1) Shift the 12 bit dividend one bit position to the left:

```
11 | 000001 ¦ 001110
```

Now perform a trial subtraction of the divisor from that portion of the dividend that appears to the left of the dotted line. Sampling the sign resulting from this subtraction, it is determined that a sign change has occurred because the difference is negative. Accordingly, the following occurs:

(a) A "0" partial quotient bit is generated which is placed in the bottom bit position of the quotient,
(b) No new partial dividend is developed.

The result of the first iteration appears as follows:

```
            0¦
11 | 00001 ¦ 00111
```

(2) Next shift the dividend and the quotient one bit position to the left:

```
            0-¦
11 | 000010 ¦ 0111
```

Perform a trial subtraction as in step (1). Since the difference is again negative:

(a) A "0" partial quotient bit is generated which is placed in the bottom bit position of the quotient,
(b) No new partial dividend has been developed.

The result of the second iterative process is:

```
            00¦
11 | 000010 ¦ 0111
```

(3) Again shifting the dividend and the quotient one bit position to the left:

```
            00-¦
11 | 000100 ¦ 111
```

Perform a trial subtraction. Since the difference is now positive:

(a) A "1" partial quotient bit is generated which is placed in the bottom bit position of the quotient,
(b) Utilize the result of the subtraction, as well as the remaining bits of the dividend to the right of the dotted line, as a new dividend.

The result of the third iterative process is:

```
            001¦
11 | 000100 ¦ 111
           -11 ¦
             1 ¦ 111 NEW DIVIDEND
```

(4) Shifting the new dividend and the quotient one bit position to the left:

```
        0 0 1 -¦
   11 |XXXXXX¦XX
           XX¦
          ---¦---
           1 1¦1 1
```

Perform a trial subtraction of the divisor from that portion of the dividend to the left of the dotted line. The subtraction yields a "0." Therefore, no sign change occurs, so:

(a) A "1" partial quotient bit is generated which is placed in the bottom bit position of the quotient, (b) The result of the subtraction, and the remaining bits of the dividend to the right of the dotted line, form a new dividend.

The result of the fourth iterative process is:

```
        0 0 1 1¦
   11 |XXXXXX¦XX
           XX¦
          ---¦---
          1 1¦1 1
         -1 1¦
          ---¦---
          0 0¦1 1  NEW DIVIDEND
```

(5) Shift the new dividend and the quotient one bit position to the left:

```
        0 0 1 1 -¦
   11 |XXXXXX¦X
           XX¦
          ---¦---
           XX¦XX
           XX¦
          ---¦---
          0 1¦1
```

Perform a trial subtraction as in step (4). Since the difference is negative, a sign change has occurred:

(a) A "0" partial quotient bit is generated which is placed in the bottom bit position of the quotient, (b) No new partial dividend is developed.

The result of the fifth iterative process is:

```
        0 0 1 1 0¦
   11 |XXXXXX¦X
           XX¦
          ---¦---
           XX¦XX
           XX¦
          ---¦---
          0 1¦1
```

(6) Finally, shifting the dividend and the quotient one bit position to the left:

```
        0 0 1 1 0 -¦
   11 |XXXXXX¦
           XX¦
          ---¦---
           XX¦XX
           XX¦
          ---¦---
           1 1¦
```

Performing a trial subtraction, the operation yields a "0." Therefore, no sign change occurs and as a result:

(a) A "1" partial quotient bit is generated which is placed in the bottom bit position of the quotient, (b) The result of the subtraction indicates no remainder.

The result of the sixth, and final, iterative process is:

```
        0 0 1 1 0 1¦
   11 |XXXXXX¦
            XX¦
           ---¦---
            XX¦XX
            XX¦
           ---¦---
            1 1¦
           -1 1¦
           ---¦---
 REMAINDER  0 0¦
```

Thus, $3_{10}\overline{)39_{10}}=11_2\overline{)100111_2}=1101_2=13_{10}$

The foregoing calculation utilizes six iterative steps in developing the quotient according to the conventional one bit divide operation. In the following calculation of the identical problem the number of iterative steps is halved due to the fact that two quotient bits are simultaneously generated during each step. This operation which is performed by apparatus to be described hereinafter takes advantage of the facts that a multi-bit position shift can be accomplished just as fast as a one position shift, and a plurality of trial subtractions may be performed simultaneously.

In the following calculation the plurality of trial subtractions which are performed during each iterative step are:

(a) $4A_n-X$
(b) $4A_n-2X$
(c) $4A_n-3X$ where $n$=number of iterative step
$A_n$=partial dividend for the $n$th iterative step
$X$=divisor The ground rules which are followed with respect to these subtractions are dictated by sampling the signs of the subtraction results. The rules are:

(1) If (a), (b), and (c) are negative, the quotient bits generated are 00 and the dividend $A_n$ is retained.

(2) If (a) is positive, and (b) and (c) are negative, the quotient bits are set 01 and the quantity resulting from the (a) subtraction becomes the new dividend.

(3) If (a) and (b) are positive, and (c) is negative, the quotient bits are set 10 and the quantity resulting from the (b) subtraction becomes the new dividend.

(4) If (a), (b), and (c) are positive, the quotient bits are set 11 and the quantity of the (c) subtraction becomes the new dividend.

It is well known that the fourth multiple of a binary number is obtained by left shifting the number two bit positions. Accordingly, the multi-bit position shifting utilized by the calculation which follows is a two bit position shift.

Once again, the problem to be solved is:

$3_{10}\overline{)39_{10}}=11_2\overline{)100111_2}$

Utilizing a similar format to that employed in the one bit divide operation, the problem may be set up as:

```
          ¦
 11 |000000¦100111
          ¦
```

The solution to this problem by a two bit divide technique is as follows:

(1) Shift the 12 bit dividend two bit positions to the left:

```
          ¦
 11 |000010¦0111
          ¦
```

Now perform the simultaneous trial subtractions from that portion of the dividend that appears to the left of the dotted line (this being $4A_1$):

$4A_1-X=10-11$
$4A_1-2X=10-110$
$4A_1-3X=10-1001$

Sampling the signs resulting from these subtractions and applying the ground rule 1:

(a) "00" partial quotient bits are generated which are placed in the bottom two bit positions of the quotient, (b) No new partial dividend is developed.

The result of the first iteration appears as follows:

```
        00|
    ------|----
11 | 000010|0111
          |
```

(2) Next shift the dividend and the quotient two bit positions to the left:

```
        00--|
    --------|--
11 | 001001|11
            |
```

Perform the trial subtractions as in step (1):

$$4A_2-X=1001-11$$
$$4A_2-2X=1001-110$$
$$4A_2-3X=1001-1001$$

Sampling the signs resulting from these subtractions and applying ground rule 4:

(a) "11" partial quotient bits are generated which are placed in the bottom two bit positions of the quotient, (b) The quantity $4A_2-3X$ becomes the new dividend The result of the second iteration appears as follows:

```
      0011|
    ------|--
11 | 001001|11
      1001|
      ----|
      0000|11 NEW DIVIDEND
          |
```

(3) Shift the dividend and the quotient two bit positions to the left:

```
      0 0 1 1 - -|
    -------------|----
11 | X X X X X X |
         X X X X |
        ---------|----
         0 0 1 1 |
                 |
```

Perform the trial subtractions as in step (1):

$$4A_3-X=11-11$$
$$4A_3-2X=11-110$$
$$4A_3-3X=11-1001$$

Sampling the signs resulting from these subtractions and applying ground rule 2:

(a) "01" partial quotient bits are generated which are placed in the bottom two bit positions of the quotient, (b) The quantity $4A_3-3X$ becomes the new dividend. The result of this subtraction indicates no remainder The result of the third, and final, iteration is:

```
               0 0 1 1 0 1|
             -------------|----
         11 | X X X X X X |
                  X X X X |
                 ---------|----
                  0 0 1 1 |
                    - 1 1 |
                 ---------|----
REMAINDER             0 0 |
                          |
```

Thus, $$3_{10}\ \overline{)30_{10}}=11_2\ \overline{)100111_2}=1101_2=13_{10}$$

Now that the division technique has broadly been discussed, an illustrative embodiment of a divider utilizing this technique will be set forth. Referring to FIGURE 1, there is illustrated in block diagram form an arrangement for loading the divider prior to the actual division operation. As stated previously, in a process for simultaneously generating a plurality of quotient bits, it is necessary to produce multiples of the divisor. In this illustrative embodiment a two bit divide system will be employed to correspond with the sample calculations just described. Accordingly, the divisor and the second and third multiples thereof are necessary for the operation.

To store these values, three registers are provided. These are labeled as the 1X, 2X and 3X registers of the X-register group and may be any type of well known register capable of retaining stored information during usage. The registers have been interconnected in a conventional manner to illustrate one method by which the multiples of the divisor may be produced.

Prior to the division operation a divisor value from the computer memory is supplied to the 1X register. It will be appreciated that the second multiple of a binary number is simply the first multiple shifted one bit position to the left, and that the third multiple is the sum of the first and second multiples. Accordingly, the 1X register is physically connected through an AND gate 10 to the 2X register such that on conditioning of AND gate 10, the divisor is loaded into the 2X register in a shifted relationship with respect to the 1X register. Thus, a second multiple of the divisor is loaded into the 2X register. This is accomplished on the conditioning of gate 10 by a Loading Signal #1. Simultaneously, the first multiple of the divisor is applied to the feed registers of a conventional adder. On application of a Loading Signal #2 to a second AND gate 12 between the 2X register and the Adder, gate 12 is conditioned to pass the second multiple of the divisor to feed registers of the Adder. The Adder sums these two values to produce the third multiple of the divisor which is loaded into the 3X register through AND gate 14 on conditioning thereof by a Loading Signal #3.

During the loading operation it is also necessary to load the dividend from memory into divider registers. In the illustrative embodiment these registers are labeled as the A and Q registers. It will be understood that these may be separate registers or may comprise distinct portions of the same register. For convenience during this description they will be considered as separate registers. The dividend from the computer memory is loaded into the Q register on application of Loading Signal #1 to an AND gate 16. For purposes to be discussed further in detail hereinafter, the dividend occupies the highest order portion of the Q register, the most significant bit of the dividend being loaded into the highest order stage of the Q register. In considering the registers of this divider, it will be assumed that the order of significance increases from right to left so that the highest order bit position is at the left-hand end of the register.

Referring now to FIGURE 2 of the drawings, an illustrative embodiment of the entire divider is shown. This divider comprises three X registers, as described with reference to FIGURE 1, for holding the first, second and third multiples of the divisor. The output of each of the X registers is connected respectively to associated AND gates 20, 22 anad 24. Second inputs to these AND gates are timed Start Divide signals. The output of AND gate 20 is connected as an input to a first difference network labeled the $4A_n-X$ network. Similarly, AND gates 22 and 24 are connected from their outputs to the $4A_n-2X$ and $4A_n-3X$ difference networks, respectively. The A register, described with reference to FIGURE 1, is connected through AND gate 26 to each of the three difference networks. As the second input to gate 26, the timed Start Divide signal is also employed.

To set the quotient bits in the Q register, the structure employed is a sign sampling arrangement connected to the outputs of the difference networks, this sign sampling arrangement having associated therewith appropriate logic to properly position the generated quotient bits in the Q register. More specifically, to the output of the $4A_n-X$ network a sign sampling circuit 28 is connected. The output of sign sampling circuit 28 is connected to the input of an inverter 30 which, in turn, has its output connected as one input to an AND gate 32. The output of AND gate 32 is applied as an input of an additional AND gate 34, the output of which is directed to the lowest order bit position of the Q register. For convenience of illustration, the two lowest order bit positions of the Q register have been defined by the dotted lines therein, and it will be appreciated that the size of these bit positions has been greatly exaggerated with respect to the entire length of the Q register. The output of the $4A_n-2X$ difference network is applied to a sign sampling circuit 36, the output of which is connected to an inverter 38. The inverted signal appearing at the output of inverter 38 is connected as one input to an AND gate 40, the output of which is connected to the second lowest bit position of the Q register. The output of inverter 38 is also passed through an inverter 42 to serve as the second input to AND gate 34. Difference network $4A_n-3X$ has its output connected through a sign sampling circuit 44 and an inverter 46 to one input of an AND gate 48. The output of AND gate 48 is connected to the lowest bit position of the Q register. Timed Gating Signals are applied through appropriate leads to serve as the second inputs to AND gates 32, 40 and 48.

The divider also includes appropriate logic circuitry for controlling the application of a new dividend to the A register. The output of the $4A_n-X$ difference network is applied as one input to an AND gate 50. Second and third inputs to gate 50 are, respectively, the outputs of inverter 30 and sign sampling circuit 36. The output of difference network $4A_n-2X$ is connected as one input to an AND gate 52. The remaining inputs to gate 52 are the outputs of inverter 38 and sign sampling circuit 44. The output of the $4A_n-3X$ difference network is applied as one input to an AND gate 54 to which there is also applied as inputs the outputs of inverters 38 and 46. The outputs of AND gates 50, 52 and 54 are combined at a junction 56 and are applied to the lowest order portion of the A register, the lowest order bit of the output appearing at junction 56 being placed in the lowest order bit position of the A register.

To the A and Q registers there is also connected appropriate circuitry to effect a shifting operation. As stated previously, the A and Q registers may be interconnected separate storage devices or may comprise distinct portions of the same register. In order to effect a two bit position shift within these registers whenever a Timed Shift signal is supplied thereto, the physical arrangement of these registers is such that alternate bit positions are interconnected so that on shifting, information is transferred two bit positions to the left. This requires the highest order bit position of the Q register be connected to the second lowest bit position of the A register, and similarly, the second highest bit position of the Q register be joined to the lowest order bit position of the A register.

With the structure of the illustrative embodiment of the divider set forth, its operation will now be described. Assuming that multiples of the divisor have been inserted in the X registers in accordance with the operation described with reference to FIGURE 1, and the dividend from memory has been loaded into the highest order positions of the Q register, the first operation which takes place is the application of a Timed Shift signal to the A and Q registers thereby shifting the dividend two bit positions to the left such that the two highest order bits of the dividend are positioned in the lowest order bit positions of the A register. A Start Divide signal, timed with relation to the Shift signal, is then applied to AND gates 20, 22, 24 and 26 such that the information in register A is loaded into the three difference networks and the divisor multiples from the X registers are appropriately loaded into their respective networks. This loading of information to the difference networks is accomplished without destruction of the information in the A and X registers. The difference networks operate simultaneously to calculate the three differences. Each difference is sampled for sign by circuits 28, 36 and 44, respectively. Although, for convenience of discussion, these sign sampling circuits have been illustrated as being external to the difference networks, it will be obvious that these circuits may actually form a part of the difference networks. The logic system set forth in this embodiment is based on the assumption that if the difference generated by the networks is negative, the output of the sign sampling circuit is a logical "1." If the difference is zero or positive, then the sign bit of the sampling circuit is a logical "0."

Correlating this assumption with the ground rules previously set forth, the following relationship exists:

With respect to ground rule 1, if the outputs of the three difference networks are negative then the outputs of sign sampling circuits 28, 36 and 44 are logical "1's." These outputs are inverted by circuits 30, 38 and 46 to apply logical "0's" to AND gates 32, 40 and 48 such that on the application of a Timed Gating Signal to these AND gates, no information will be passed as the gates are not conditioned. Consequently, AND gate 34, which relies on a "1" output from gate 32 to be conditioned, is also not conditioned resulting in zero outputs being applied to both the lowest and second lowest bit positions of the Q register.

Referring now to the second ground rule, if the output of the $4A_n-X$ register is zero or positive, and the outputs of the remaining difference networks are negative, the output of the sign sampling circuit 28 is a logical "0" which is inverted by circuit 30 to apply a logical "1" to AND gate 32. However, the outputs of inverters 38 and 46 remain "0's" thereby preventing gates 40 and 48 from being conditioned. The output of inverter 38 is applied through inverter 42 to place a logical "1" on AND gate 34. Therefore, when a Timed Gating Signal is applied to AND gates 32, 40 and 48, gate 32 is conditioned as is gate 34 to apply a logical "1" to the lowest order bit position of the Q register.

If the $4A_n-X$ and $4A_n-2X$ difference networks produce zero positive results, as described in ground rule 3, and $4A_n-3X$ network is negative, the outputs of sampling circuits 28 and 36 are logical "0's" which, after inversion, condition gates 32 and 40, respectively. However, the logical "1" output of inverter 38 is again inverted by circuit 42 to generate a logical "0" as an input to gate 34. Accordingly, when the Timed Gating Signal is applied to gates 32, 40 and 48, a path to the Q register is completed only through gate 40 thereby applying a logical "1" to the second lowest bit position thereof.

If the results of the three difference networks are zero or positive, as per ground rule 3, the outputs of the sign sampling circuits 28, 36 and 44 are all logical "0's" which, when inverted by inverters 30, 38 and 46, respectively, become logical "1's" to condition gates 32, 40 and 48. Once again, however, inverter 42 prevents gate 34 from being conditioned such that on application of Timed Gating Signals, only gates 40 and 48 are conditioned to pass logical "1's" to the two lowest order bit positions of the Q register.

The effect of the differences generated by the difference networks in determining new dividends in accordance with the ground rules will now be described as follows:

Under ground rule 1 when the differences of all three networks are negative, the outputs of sign sampling circuits 28, 36 and 44 are logical "1's." The action of inverter 30 results in a logical "0" being applied to AND gate 50. Similarly, the output of inverters 38 and 46 result in zero inputs to gates 52 and 54. Accordingly, none of the AND gates 50, 52 or 54 is conditioned so that the output at junction point 56 is "0" thereby causing the dividend $A_n$ to be retained in the A register.

If, as provided in ground rule 2, the difference generated by the $4A_n-X$ network is zero or positive and the remaining difference networks produce negative differences, the sign sampling circuit 28 generates a logical "0" which is inverted by circuit 30 to apply a logical "1" to AND gate 50. The output of sampling circuit 36 is also a logical "1" resulting in the conditioning of gate 50 to pass the quantity resulting from the subtraction of the $4A_n-X$ network to the A register via junction 56. The logical "0" outputs of the inverters 38 and 46 prevent gates 52 and 54 from being conditioned. Accordingly, the quantity from the $4A_n-X$ network becomes a new dividend and the portion of the prior dividend in the A register is destroyed.

If the sign sampled by the circuits 28 and 36 is zero or positive, as per ground rule 3, then the outputs of these circuits are logical "0's" which are respectively inverted by circuits 30 and 38. The output of sampling circuit 36 is applied to gate 50 thereby preventing this gate from being conditioned. However, the logical "1" inputs from inverter 38 and the sign sampling circuit 44 condition gate 52 to permit the quantity resulting from the subtraction in the $4A_n-2X$ network to pass to the A register thereby displacing the prior portion of the dividend therein. Once again, gate 54 is not conditioned due to the "0" output from the inverter 46.

Considering ground rule 4, when the differences generated by the three networks are all zero or positive, the outputs of sampling circuits 28, 36 and 44 are all logical "0's." Accordingly, inputs to the AND gates 50 and 52 from the sampling circuits are "0's" preventing them from being conditioned. The outputs of inverters 38 and 46 are logical "1's" thereby conditioning gate 54 to permit the quantity of the subtraction performed in the $4A_n-3X$ network to be passed to the A register to become a new dividend replacing the prior portion of the dividend therein.

On completion of the logic operations just described, the information in the A and Q registers is again shifted two places to the left and the division operation is repeated to cause additional subtractions in the difference networks, the results of which are sampled to create new quotient bits and to determine whether a new dividend is generated. The above described cycle is repeated until the calculation is completed.

The invention provides a high speed division device which may be utilized to appreciably decrease the number of iterations necessary to perform a division operation thereby greatly accelerating the calculation. It will be understood that this technique may be expanded to further decrease the number of iterations by increasing the number of difference networks and divisor multiples.

The above described embodiment is illustrative of a preferred embodiment of the invention but is not intended to limit the possibilities of insuring the feature of an increased speed in performing a high speed division operation. For example, other modifications which may be made include a re-design of the logic array in conformity with standard logic principles to generate quotient bits and new dividends according to the ground rules set forth in the specification. The division device disclosed herein is an example of an arrangement in which the inventive features of this disclosure may be utilized and it will become apparent to one skilled in the art that certain modifications may be made within the spirit of the invention as defined by the appended claims.

What is claimed is:

1. A high speed parallel divider for a digital computer comprising a first register means for storing multiples of a divisor and a second reigster means for storing a dividend, the highest order digits of said dividend being located in the highest order bit positions of said second register, a plurality of difference networks, a third register means, means for shifting a plurality of dividend bits forming a portion of said dividend from the highest order positions of said second register into the lowest order bit positions of said third register and simultaneously shifting the remainder of said dividend into the highest order bit positions of said second register; means for applying said plurality of dividend bits in said third register to each of sad difference networks and means for simultaneosuly applying each of said divisor multiples to separate ones of said networks to thereby perform a plurality of trial subtractions; sign sampling means associated with each of said difference networks for determining the sign of each trial subtraction; logic means responsive to said sign sampling to generate a plurality of partial quotient bits, and means for applying the generated plurality of partial quotient bits to the lowest order positions of said second register means, and means to simultaneously shift said partial quotient bits to higher order bit positions of said second register on subsequent shifting of said dividend bits.

2. A high speed parallel divider as set forth in claim 1 further comprising additional logic means responsive to said sign sampling for producing new dividend bits when at least one of said samplings is positive.

3. A high speed parallel divider as set forth in claim 2 further including means for replacing the dividend bits in said third register by said new dividend bits produced, said new bits comprising the lowest positive difference resulting from said trial subtraction.

4. A high speed parallel divider for a digital computer comprising a first register means for storing first, second and third multiples of a divisor and a second register means for storing a dividend, the highest order digits of said dividend being located in the highest order bit positions of said second register, three difference networks, a third register means, means for shifting the highest order pair of dividend bits from the two highest order bit positions of said second register into the two lowest order bit positions of said third register and simultaneously shifting the remainder of said dividend into the highest order bit positions of said second register; means for applying said dividend bits in said third register to each of said difference networks and means for simultaneously applying each of said divisor multiples to separate ones of said networks to thereby perform three trial subtractions; sign sampling means associated with each of said difference networks for determining the sign of each trial subtraction; logic means responsive to said sign sampling to generate a pair of partial quotient bits, and means for applying the generated bits to the two lowest bit positions of the second register means, and means to simultaneously shift the partial quotient bits in said second register to two higher order bit positions on subsequent shifting of said dividend bits.

5. A high speed parallel divider as set forth in claim 4 further comprising additional logic means responsive to said sign sampling for producing new dividend bits when at least one of said samplings is positive.

6. A high speed parallel divider as set forth in claim 5 further including means for replacing the dividend bits in said third register by said new dividend bits produced, said new bits comprising the lowest positive difference resulting from the trial subtraction.

References Cited by the Examiner

UNITED STATES PATENTS

| | | | |
|---|---|---|---|
| 3,222,505 | 12/1965 | Booher | 235—167 |
| 3,223,831 | 12/1965 | Holleran | 235—164 |

OTHER REFERENCES

Pages 169–174, June 1961, Saltman, R. G. "Reducing Computing Timing for Synchronous Binary Division," I.R.E. Transactions on Electronic Computers.

MALCOLM A. MORRISON, *Primary Examiner.*

M. J. SPIVAK, *Assistant Examiner.*